Dec. 3, 1946.  J. H. GIESKE  2,412,084
PROTRACTOR
Filed Oct. 22, 1943
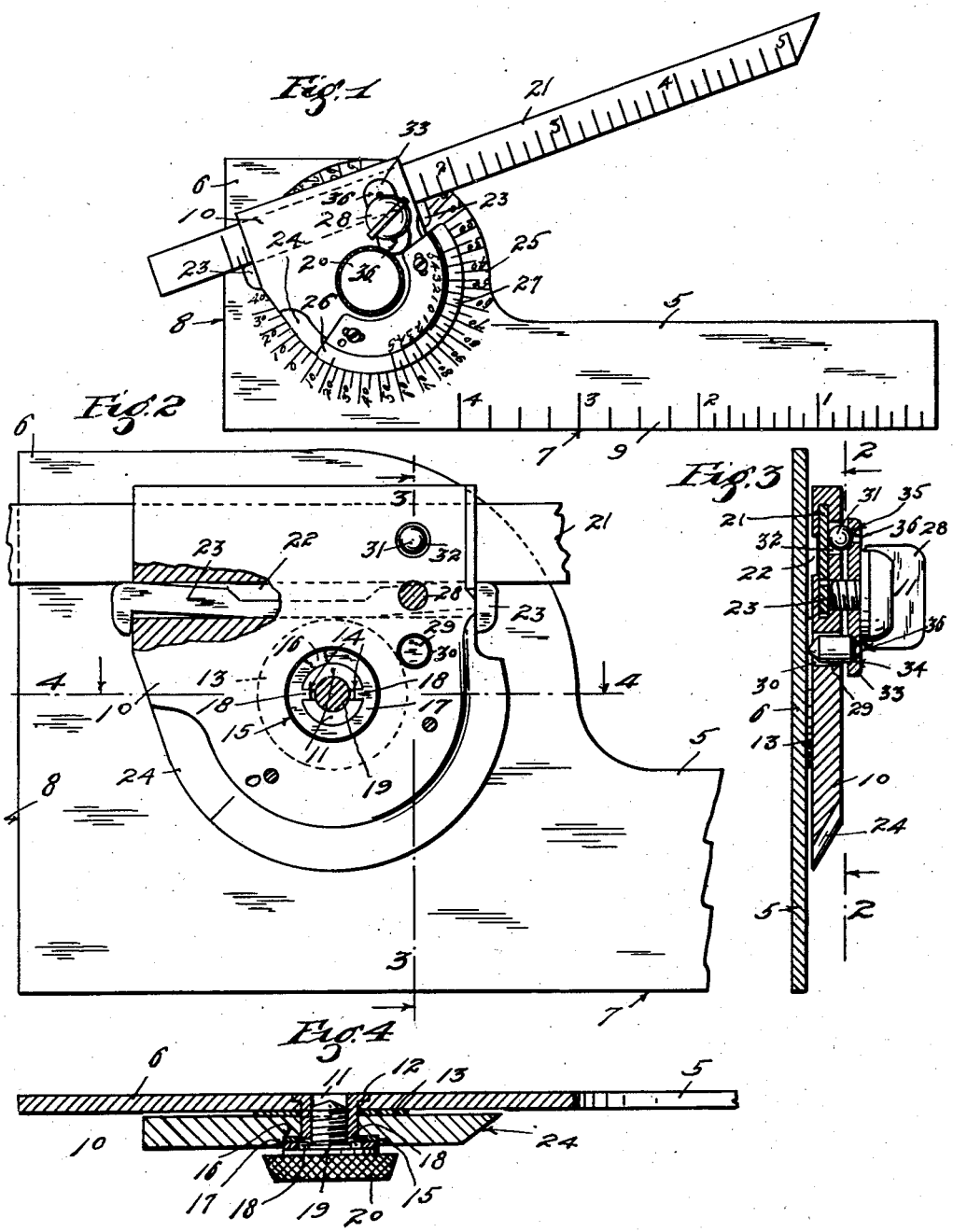
INVENTOR
Joseph H. Gieske
By his Attorney
Harry N. Kilgore Patented Dec. 3, 1946

2,412,084

UNITED STATES PATENT OFFICE 2,412,084

PROTRACTOR

Joseph H. Gieske, St. Paul, Minn., assignor, by mesne assignments, to Niel C. Smith, Minneapolis, Minn.

Application October 22, 1943, Serial No. 507,342

4 Claims. (Cl. 33—94)

My invention relates to improvements in protractors and, more particularly, to a protractor of the pocket type.

The improved protractor, while intended for general use, is, due to its novel construction, compactness and light-weight, especially well adapted for use by persons engaged in engineering, such as chief engineers, research engineers, tool grinders, machinists, etc., where a quickly accessible protractor is required most of the time.

The object of this invention is to provide novel means in which a turnable member and a slidable member may be simultaneously locked to a body member in different adjustments relative to each other and relative to the body member.

Other objects of this invention will be apparent from the following description, reference being had to the accompanying drawing, in which like characters indicate like parts throughout the several views.

Referring to the drawing:

Fig. 1 is a plan view of the improved protractor;

Fig. 2 is a fragmentary plan view, some parts being removed, other parts being broken away and sectioned, and still other parts sectioned on the line 2—2 of Fig. 3 on an enlarged scale; and Figs. 3 and 4 are detail views principally in section taken on the lines 3—3 and 4—4 of Fig. 2, respectively.

The numeral 5 indicates a body member in the form of a flat thin blade having at one end an enlarged head 6. This body member 5 has a long straight edge 7 and a short straight edge 8 at the head 6 and which two edges extend at right angles to each other. A scale 9 on the body member 5, at its straight edge 7, reads from the narrow end of said body member in inches and fractions thereof.

A turret 10 is turnably mounted on a short tubular stud 11 that is perpendicular to the plane of the body member 5 and its axis, as well as the axis of the turret 10, is exactly the same distance from the two straight edges 7 and 8. This stud 11, which is rigidly secured to the body member 5, extends upwardly through a hole in said body member and has on its lower or inner end a head 12 countersunk in the under side of the body member 5 so that the under side of said body member 5 is perfectly smooth and will lie flat on the table or other support on which the protractor rests. A large thin washer 13 on the stud 11 is interposed between the body member 5 and the turret 10. Formed in the outer end of the tubular stud 11 is a pair of diametrically opposite keyways 14. In the upper face of the turret 10 is an annular depression 15 that surrounds the stud 11 and is concentric therewith. Resting on the bottom of the depression 15 and surrounding the stud 11 is a thin washer 16 and on top of this washer 16 is a thicker washer 17 having keys 18 that extend into the keyways 14 and hold the washer 17 from turning on said stud, but is free for relative axial movement. A relatively heavy screw 19 extends into the stud 11 and has threaded engagement therewith. This screw 19 has a large knurled head 20, the under side of which bears on the washer 16 and is held thereby spaced above and out of contact with the turret 10. Obviously, by turning the screw 19 into the stud 11 the turret 10 may be frictionally clamped between the body member 5 and the head 20 of said screw and thereby held from turning relative to said body member.

A long thin arm 21 that lies in a plane parallel to the plane of the body member 5 is mounted for endwise sliding movement in a T-slot 22 in the turret 10 that is eccentric to the stud 11. It will thus be seen that the arm 21 is carried by the turret 10 for swinging movement about the axis of said stud and for relative endwise adjustment. The longitudinal edges of the arm 21 are parallel and one end thereof extends at right angles thereto and the other end thereof extends at an angle of forty-five degrees (45°) to said edges. A spring member 23 in the slot 22 frictionally engages one of the longitudinal edges of the arm 21 and holds the arm 21 where endwise adjusted therein.

A scale in inches and fractions thereof on the arm 21 reads from left to right. The turret 10, diametrically opposite the passageway 22, is downwardly and outwardly beveled on an arc of a circle whose center is at the axis of said turret, as indicated at 24. Marked on the head 6, concentric with and outwardly of the beveled edge 24 on the turret 10, is a circle divided into quarters, and each quarter is graduated into ninety degrees (90°) and the graduations of said quarter read in opposite directions from zero points as indicated at 25.

A vernier plate 26 is mounted on the turret 10 for slight circumferential adjustment about the axis of the stud 11. This vernier plate 26 has thereon a vernier scale 27 that is concentric with the degree markings 25.

To simultaneously lock, by friction, the turret 10 where adjusted with its zero point set in a predetermined position relative to the degree markings 25 and with the arm 21 endwise adjusted relative to said turret, I provide a clamp actuated by a thumb screw 28 having threaded engagement with the turret 10. This clamp comprises a pointed pin 29 loosely held in a hole 30 in the turret 10 with its point impinging against the head 6 eccentric to the stud 11, a ball 31 loosely held in a hole 32 in said turret 10 and resting on the arm 21, and a clamping bar 33 resting on said pin and ball. The clamping bar 33 has in its under side seats 34 and 35 for the pin 29 and the ball 31, respectively. At the center of each seat 34 and 35 is a small hole 36 in the clamping bar 33. The thumb screw 28 extends loosely through a hole in the clamping bar 33 midway between the seats 34 and 35, with its head impinging against said bar. By tightening the thumb-screw 28, the clamping bar 33 will be pressed onto the pin 30 and the ball 32 and thereby force said pin against the head 6 to frictionally lock the turret 10 relative to the body member 5 and the ball 32 will also be forced by the clamping bar 33 against the arm 21 to frictionally lock said arm relative to the turret 10.

It will be understood that the invention described is capable of various modifications within the scope of the invention herein disclosed and claimed.

What I claim is:

1. A protractor including a body member, a turret turnably mounted on the body member, an arm slidably mounted on the turret, two friction members loosely held in holes in the turret and resting, the one on the body member and the other on the arm, a clamping bar resting on the friction members, and a thumb screw extending through a hole in the clamping bar and having threaded engagement with the turret.

2. The structure defined in claim 1 further including seats in the clamping bar for the friction members.

3. A protractor including a body member, a turret turnable on the body member, an arm mounted in a passageway in the turret below the top thereof for endwise sliding movement eccentric to the axis of the turret, and screw-actuated clamping means for holding the turret from turning relative to the body member, and extending through a hole in the turret and engaging the arm for holding the same against endwise sliding movement.

4. A protractor including a body member, a turret turnable on the body member, an arm mounted in a passageway in the turret below the top thereof for endwise sliding movement eccentric to the axis of the turret, and means for holding the turret from turning relative to the body member and for holding the arm against endwise sliding movement relative to the turret, said means including a clamping bar, a headed screw extending through a hole in the clamping bar with its head engaging said bar for applying pressure thereto, and a member extending through a hole in the turret, engaging the arm and actuated by the clamping bar.

JOSEPH H. GIESKE.